(12) United States Patent
Adrain

(10) Patent No.: US 12,007,208 B2
(45) Date of Patent: Jun. 11, 2024

(54) ANTIBALLISTIC WINDOW RETROFITTING APPARATUS AND METHOD

(71) Applicant: John B. Adrain, Spokane, WA (US)

(72) Inventor: John B. Adrain, Spokane, WA (US)

( * ) Notice: Subject to any disclaimer, the term of this patent is extended or adjusted under 35 U.S.C. 154(b) by 0 days.

(21) Appl. No.: 16/761,098

(22) PCT Filed: Nov. 2, 2018

(86) PCT No.: PCT/US2018/059036
§ 371 (c)(1),
(2) Date: May 1, 2020

(87) PCT Pub. No.: WO2019/090133
PCT Pub. Date: May 9, 2019

(65) Prior Publication Data
US 2020/0355471 A1 Nov. 12, 2020

Related U.S. Application Data

(60) Provisional application No. 62/581,308, filed on Nov. 3, 2017.

(51) Int. Cl.
| F41H 5/04 | (2006.01) |
| E06B 3/67 | (2006.01) |
| E06B 5/10 | (2006.01) |
| F41H 5/26 | (2006.01) |
| B32B 17/10 | (2006.01) |

(52) U.S. Cl.
CPC ......... *F41H 5/0407* (2013.01); *E06B 3/6722* (2013.01); *E06B 5/106* (2013.01); *F41H 5/26* (2013.01); *B32B 17/10036* (2013.01)

(58) Field of Classification Search
CPC ........ F41H 5/0407; F41H 5/26; E06B 3/6722; E06B 5/10; E06B 5/106; B32B 17/10036; B32B 17/10055
USPC ....................... 89/36.02, 905, 936
See application file for complete search history.

(56) References Cited

U.S. PATENT DOCUMENTS

| 5,506,051 | A | * | 4/1996 | Levy-Borochov | ...... B29C 41/22 428/332 |
| 2010/0024950 | A1 | * | 2/2010 | Broos | ....................... E06B 5/10 156/60 |
| 2010/0031810 | A1 | * | 2/2010 | Neal | ..................... F41H 5/0407 89/36.02 |
| 2010/0275767 | A1 | * | 11/2010 | Pinckney | .......... B32B 17/10119 89/36.02 |
| 2011/0308381 | A1 | * | 12/2011 | Hartley | ............. B32B 17/10174 89/36.02 |
| 2012/0174756 | A1 | * | 7/2012 | Wilson | ..................... F41H 5/04 89/36.02 |
| 2015/0064374 | A1 | * | 3/2015 | Jain | ................... B32B 17/10137 428/34 |

* cited by examiner

*Primary Examiner* — Bret Hayes
(74) *Attorney, Agent, or Firm* — Bodi Law LLC

(57) ABSTRACT

A system and method for retrofitting installed thermal windows to provide anti-ballistic properties to the windows by using a portable system for filling gaps in the windows with an anti-ballistic material that may or may not be cured. Also provided is an optional capability to add controllable tinting capability to these retrofitted windows.

18 Claims, 3 Drawing Sheets

ANTIBALLISTIC WINDOW RETROFITTING APPARATUS AND METHOD

CROSS-REFERENCES TO RELATED APPLICATIONS

This application is a national stage application of PCT application PCT/US2018/059036 filed on Nov. 2, 2018, which claims the benefit of U.S. provisional application Ser. No. 62/581,308 filed on Nov. 3, 2017, all hereby incorporated herein by reference.

BACKGROUND

Protecting buildings against ballistic projectiles is sometimes a concern, even in buildings that are already constructed and outfitted. Many buildings use multiple pane glass windows of various types, such as thermal windows, where a gap is provided between two or more panes of glass. This gap may be filled with air, an insulating gas, or even a vacuum. A system of converting such already installed windows to exhibit anti-ballistic properties (e.g., bullet-proofing) without replacing the windows in an economical manner would be useful to add antiballistic features to existing buildings at minimal cost.

SUMMARY

Provided are a plurality of example embodiments, including, but not limited to, a method that uses an apparatus to reconfigure existing multiple paned windows into anti-ballistic windows without removing or replacing the windows.

Also provided is a method of adapting an installed window to have anti-ballistic properties, comprising the steps of:
   drilling one or more holes in the installed window or a frame of the installed window; and
   pumping a fluid to add anti-ballistic properties to the installed window through the one or more holes into a gap between panes of transparent material in the installed window.

Subsequent to the pumping step, the installed window exhibits improved anti-ballistic properties.

Further provided is a method of adapting an installed window to have anti-ballistic properties, comprising the steps of:
   drilling one or more holes in the installed window or a frame of the installed window;
   pumping, using a portable pumping system, a fluid to add anti-ballistic properties to the installed window through the one or more holes into a gap between panes of transparent material in the installed window;
   vibrating the installed window to enhance settling of the fluid into the gap between panes of transparent material in the installed window; and
   sealing the drilled holes subsequent to the step of pumping the fluid.

Subsequent to the pumping step, the installed window exhibits improved anti-ballistic properties.

Also provided is a method of adapting an installed window to have anti-ballistic properties using a portable system comprising a pump and at least one tank of a fluid, the method comprising the steps of:
   drilling one or more holes in the installed window or a frame of the installed window; and
   pumping, using the portable system, the fluid to add anti-ballistic properties to the installed window through the one or more holes into a gap between panes of transparent material in the installed window.

Subsequent to the pumping step, the installed window exhibits improved anti-ballistic properties.

Further provided is a portable system for retrofitting an installed window to have anti-ballistic properties, such that might perform any of the methods provided hereinabove, the system comprising: a drilling subsystem to drill one or more holes in the installed window or a frame of the installed window; a tank for holding a fluid; and a pump and distribution system for transporting the fluid from the tank into a gap between panes of the installed windows through the drilled one or more holes.

Still further provided is the above system further comprising a vibrating device configured to vibrate the installed window to enhance settling of the fluid into the gap between the panes of the window.

Also provided are additional example embodiments, some, but not all of which, are described hereinbelow in more detail.

BRIEF DESCRIPTION OF THE DRAWINGS

The features and advantages of the example embodiments described herein will become apparent to those skilled in the art to which this disclosure relates upon reading the following description, with reference to the accompanying drawings, in which.

DETAILED DESCRIPTION OF THE EXAMPLE EMBODIMENTS

Figure 3:
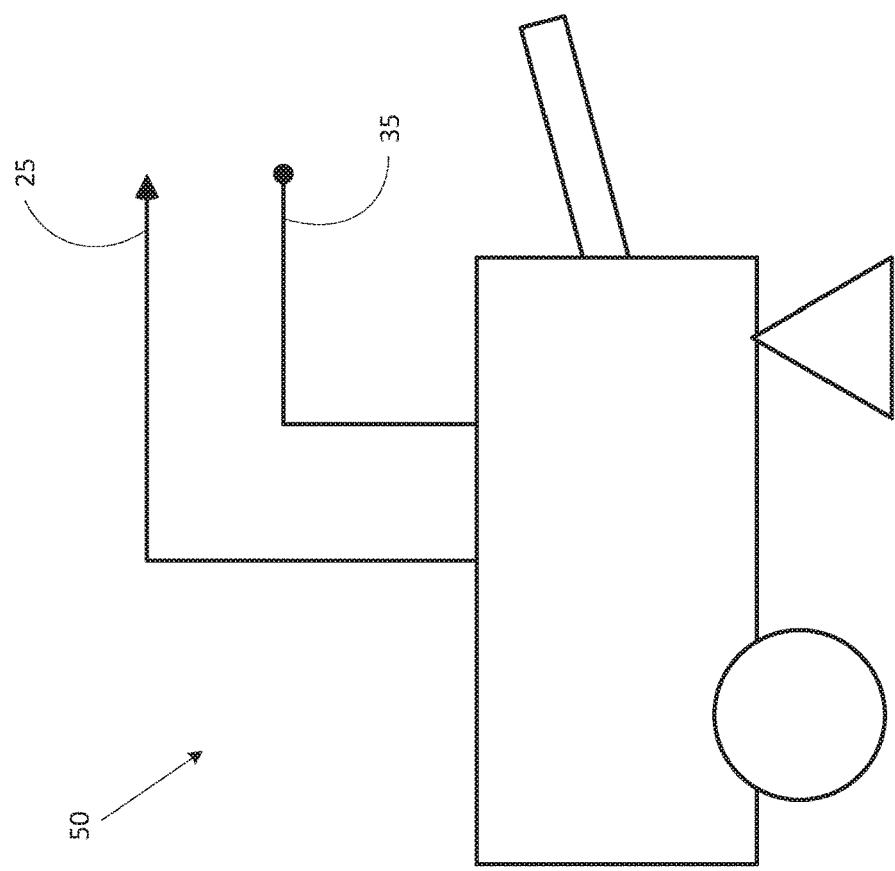
FIG. 3 is a schematic drawing of an example mobile platform for transporting a system such as provided in FIG. 2.

Various methodologies using particular equipment for retrofitting windows is provided.

Generally, existing windows utilizing multiple panes of glass with gaps between them (such as for thermal efficiency) are adapted to having anti-ballistic properties through the addition of strengthening or other anti-ballistic materials within the gaps between window panes. This can be accomplished, for example, by drilling holes through the window frames, or even through the windows themselves, and then pumping an additive material into the gaps between the windows using a pumping system. The additive material can be a fluid in liquid or gel form put under pressure by using a pump and a hose and nozzle system to pump the fluid between the window panes through the drilled holes. Holes can be placed strategically both for use in accepting the nozzles for receiving the fluid, and to allow air to escape to prevent voids in the window gaps.

A vibrating device might be put into contact with the window pane or the window frame in order to vibrate the panes of glass so that the fluid settles within the window gaps in a manner to fill all voids, in particular to permit the window to remain transparent. The fluid is then cured either by heating the window panes, heating the fluid during the pumping process, using an infrared or ultraviolet cure process, or by a cure process that does not require any external curing procedure.

The fluid could be comprised of a transparent resin. Currently, bullet-proof glass can be manufactured by placing layers of resin between layers of glass or other material. Similar resins could be utilized for this modification process. Liquified plexiglass might be utilized, as might materials such as magnesium aluminate, PERLUCOR, a polycarbonate (thermoplastic) (such as provided by Armormax, Makroclear, Cyrolon, Lexan or Tuffak), epoxies, or some other material. The fluid may have particles embedded therein that add additional anti-ballistic properties, such as any of the above listed materials, and other materials such as Spinel ceramics, transparent aluminum ceramics (Alon), or other materials.

Other materials that could be utilized are materials that remain in gel or liquid form and that need not be cured. Shear thickening fluids (STF) (known as a dilatant) that are transparent can be used to fill the gaps between window panes. Some of these materials harden (or thicken) upon impact or when dealt a sharp force or shear stress, and might be comprised of non-Newtonian fluids that that thicken in response to force (such as mixtures of cornstarch and water do, such as oobleck, which could be utlilzed). Examples of such materials have been disclosed recently but their composition are trade secrets. See www.sciencealert.com/liquid-armour-is-now-a-thing-and-it-stops-bullets-better-than-kevlar and www.telegraph.co.uk/news/uknews/defence/4862103/Military-to-use-new-gel-that-stops-bullets.html for examples. Furthermore, the anti-ballistic protection can be increased by suspending particles in the liquid that "lock" together upon impact creating a bond that improves the anti-ballistic capabilities of the liquid by spreading the force of the impact across a large area. Such liquids which are transparent in the static case could be utilized for adding anti-ballistic features to existing windows. Examples of such liquids are found online at www.popsci.com/technology/article/2010-07/british-designed-%E2%80%98bulletproof-custard%E2%80%99-better-kevlar-vest.

As another alternative, an anti-ballistic layer or film might be laminated to one or both of the window panes to add further anti-ballistic capabilities. A layer or sheet of transparent material, such as magnesium aluminate, PERLUCOR, or ALON (a transparent aluminum-based ceramic material such as aluminum oxynitride), plexor, plexiglass, polycarbonate, or other material can be fixed to the window pane using a transparent resin or other material (such as polyvinyl butyral, polyurethane, Sentryglas or ethylene-vinyl acetate, for example) as a "glue" to hold the new layer in place. Alternatively, the new layer might only be fixed at the frame, and not to the glass pane itself. In some cases, multiple layers of anti-ballistic material might be used to provide additional protection. In other cases, gaps between the new layer and the original window can be filled with anti-ballistic gels or liquids that may or may not be cured and that may be otherwise solidified or may remain as a gel.

Furthermore, a combination of the above processes could be utilized, such as by adding external layers of material as described above along with filling the window gaps with anti-ballistic materials, also described above. By providing more layers and more filled gaps, additional protection from ballistic weapons can be provided, as desired.

Finally, the material used to fill the gaps in the window panes can be modified to provide electrochemical tinting capability in addition to the anti-ballistic properties. By adding LCD materials or other materials that can change state under electrical charge to turn the window from a transparent to a semi-transparent or even opaque state using an electrical control system, the window can be provided with tinting capabilities. Such features can be provided in "smart glass" or "smart tinting glass". Such glass can utilize electrochromic, photochromic, thermochromic, suspended-particle, micro-blind and polymer-dispersed liquid-crystal devices to make buildings more climate adaptive.

For example, suspended-particle devices (SPDs), rod-like nano-scale particles can be suspended in the liquid that is to be placed between two pieces of glass or plastic panes in an existing window system, along with a control system that provides a voltage to change the orientation of the particles to block light. As an alternative, electrochemical additive can be provided that changes its opacity based on application of a voltage can also be used.

The gap filling process could be used to "retrofit" existing window systems in already installed windows, such as in skyscrapers or even in single family homes, schools, offices, government buildings, etc. As shown in the cross section of a window 1 in FIG. 1, upper holes 12 are drilled in a top leg of the frame 11 of the window 1, and lower holes 15 are drilled in a bottom leg of the frame 11. Alternatively, holes can be drilled in various other locations of the window pane(s) and/or window frame (s), such as on side portions or in the middle of a pane. The holes should provide access into gaps between window panes of multiple paned window systems, such a thermo pane windows. In some situations, holes may be drilled in a manner that is first horizontal into a frame 11, that then transitions vertically to enter the gap 5 between window panes, as shown by the dotted lines of the angled holes 12, 15 of the example of FIG. 1.

Figure 2:
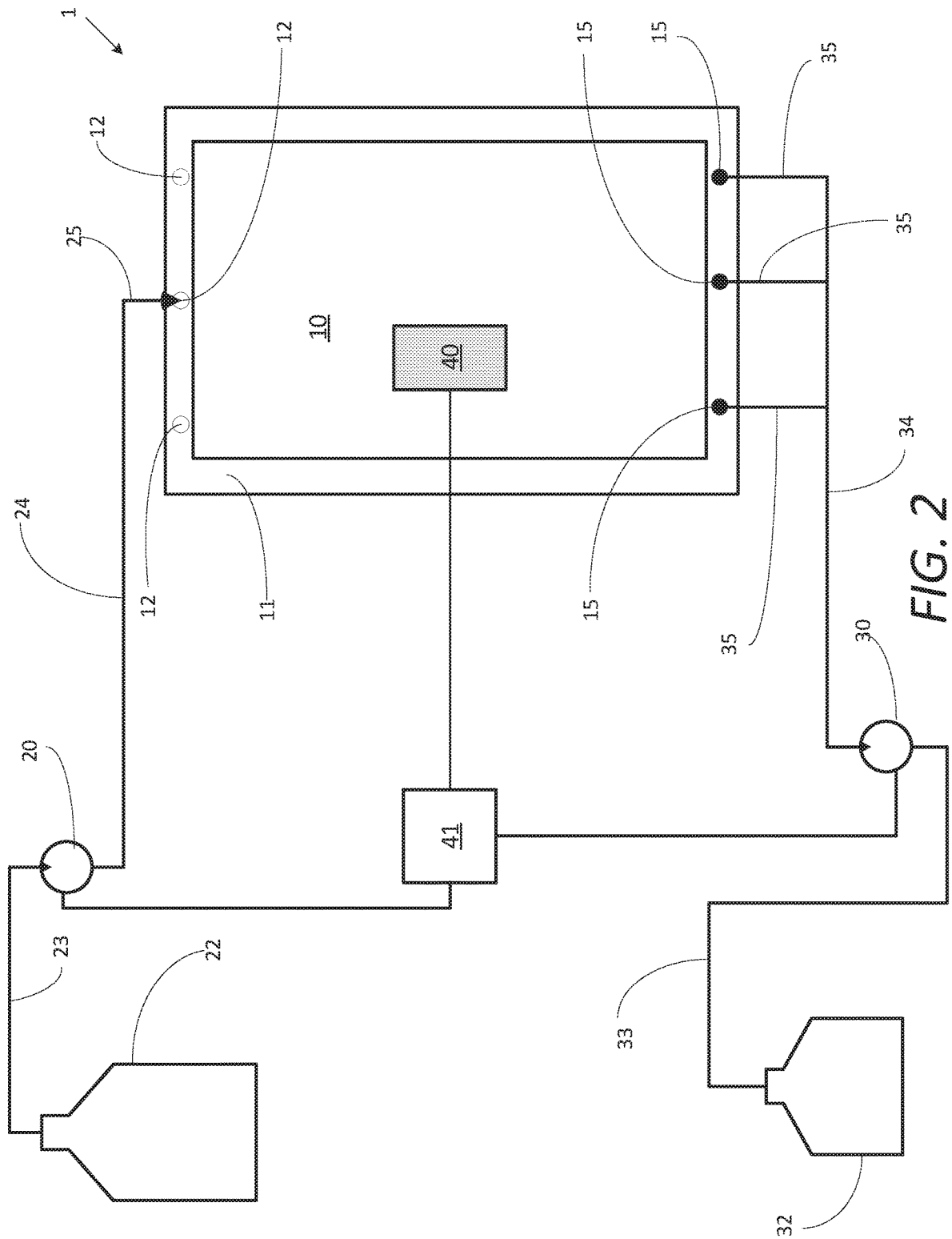
FIG. 2 is a schematic drawing of an example system configured to adapt an installed window to have antiballistic and/or tinting properties.

As shown in FIG. 2, the window 5 is to be retrofitted. A tank 22 is provided that holds an anti-ballistic fluid in a manner that facilitates application, such as by heating the fluid into a flowing liquid, or forming the liquid with segregated constituents that only cure when mixed by the pumping system. The system has a pump 20 connected to the tank 22 via a hose 23. The pump 20 pumps the one or more constituents through a hose 24 to a nozzle 25 that is inserted into one or more upper drill holes 12 provided in the window frame 11. Other upper drill holes 12 may or may not be used as fill points as well. The nozzle 25 may have a curved end or be comprised of a flexible tube so that the end of the nozzle enters the gap between the windows. The curve of the nozzle 25 should follow the curve of the drilled holes, if such holes are being utilized.

The fluid is then pumped by the pump 20 from the tank 22 (with an optional mixer if the fluid is comprised of constituent components) into the window gaps between the panes 10 under pressure to fill the gaps. Vibrating devices 40 powered by a power source 41 can be provided on the window panes 10 to aid in the settling of the fluid, which will "fall" and settle into the window gaps, with any air (or other gas) present in the gaps between the panes being released as the fluid flows into the gaps. If desired, heating devices separate from, or incorporated within, the vibrating devices might be used to heat the window panes to aid in the fluid flow, and/or aid in curing the fluid.

A vacuum device comprising a pump 30, receiving tank 32, hoses 33, 34, and nozzles 17 could also be provided to help remove the air pockets and help "pull" the fluid into the gaps using lower drilled holes 15 drilled in a bottom of the window frame 11. Such a device can provide a suction source attached to the lower drilled holes 15, such as by using the nozzles 35 or other device to enter or cover the lower drilled holes 15 to evacuate the air in the window gaps to help remove the air gaps and help cause the fluid to fully flow into and fill the gaps between the window panes.

Care should be exercised to avoid the introduction of bubbles into the fluid, which could interfere with window transparency.

Once the gap between the window panes has been substantially or fully filled with the fluid, the lower drilled holes 15 may be temporarily or permanently plugged. The same may be done to the upper drilled holes 12, if desired. The fluid in the gap may then be heated (such as by using external heating devices such a heat guns, infrared heaters, heating pads, or other heating devices), or exposed to ultraviolet light, or some other means of curing the fluid, if a curable fluid is used for filling the window gaps.

In the case where the fluid will remain as a liquid or gel in the gaps without being cured, it may be that no further treatment of the window is needed once the gap is fully filled with the fluid. In this case, the lower holes, if present, should be filled using a plug or glue or other material to avoid the fluid from leaking from between the window panes. The same may be done with the upper drilled holes as well. In some cases, a small air gap may be left at the top of the window gap between the panes to allow for expansion of the fluid due to temperature changes, whether cured or not.

Figure 1:
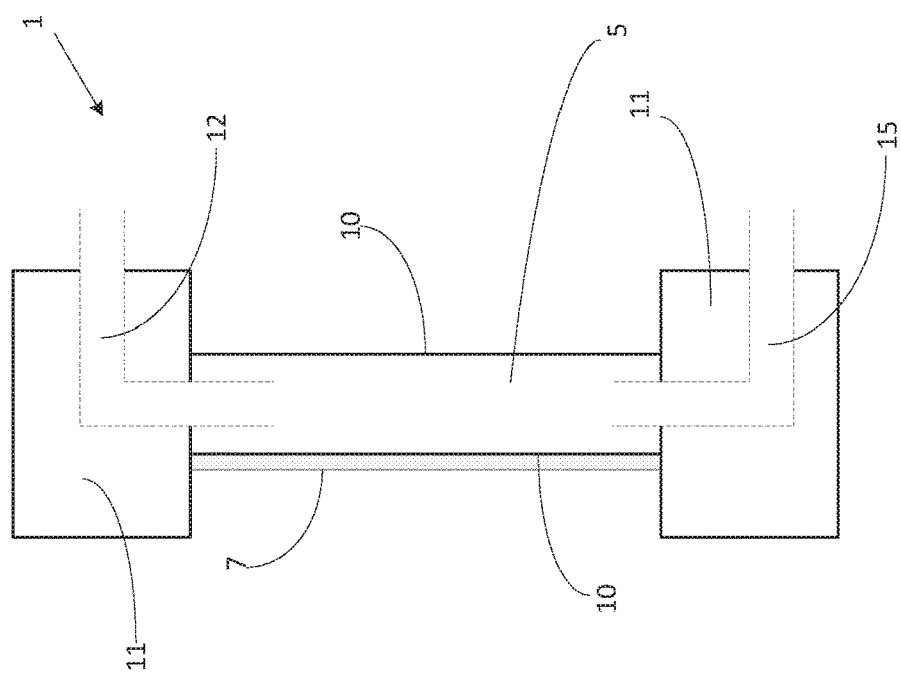
FIG. 1 is a schematic drawing showing a cross section of an installed window configured for adding antiballistic and/or tinting properties.

Alternatively, or additionally, a sheet of material 7 may be applied to one or both of the exposed window panes 10 such as by using an adhesive to adhere the sheet 7 to the window pane 10, or otherwise fixing the sheet in place by connection to the window frame(s), as shown in FIG. 1. This sheet 7 may be a layer of plexiglass or a lamination of plexiglass and glass or another material (such as discussed hereinabove) that may strengthen the resulting window to provide further protection against ballistic objects such as bullets. This sheet may prevent shattering of the glass in case of impact by a ballistic object. In some cases, the additional layer may be provided with a pocket between this new layer and the original window which may be filled with anti-ballistic material as discussed above.

In some cases, the window may be held in place using a holding device, such as might utilize suction cups or magnets on one or both sides of the window, especially in situations where the window may first be removed from the frame for treatment before being put back in place, or where treatment of the window may temporarily weaken the frame of the window thereby desiring help in holding the window in place.

Note that the components of the apparatus used to pump the fluid into the windows might be provided in a mobile device 50 as shown in FIG. 3, such as a cart, truck, vehicle, or other device. Such a device might have the tanks, heating equipment, hose and reel to wind the hose, and one or more nozzles 25, 35 all incorporated into the mobile device 50. The device might be operated within the building, or outside of the building, with the respective drilled holes being provided inside or outside, respectively. The mobile apparatus may have wheels or a pully system to ease its transport and use, and may have a self-contained power supply (such as operating using a fuel and hydraulic/pneumatic system), or might be electrically driven using batteries or an external power supply. The device 50 may be towed to location, and may be able to be transported up freight elevators, for example. The device 50 may also be provided with an engine or motor to make it easier to transport.

Figure 4:
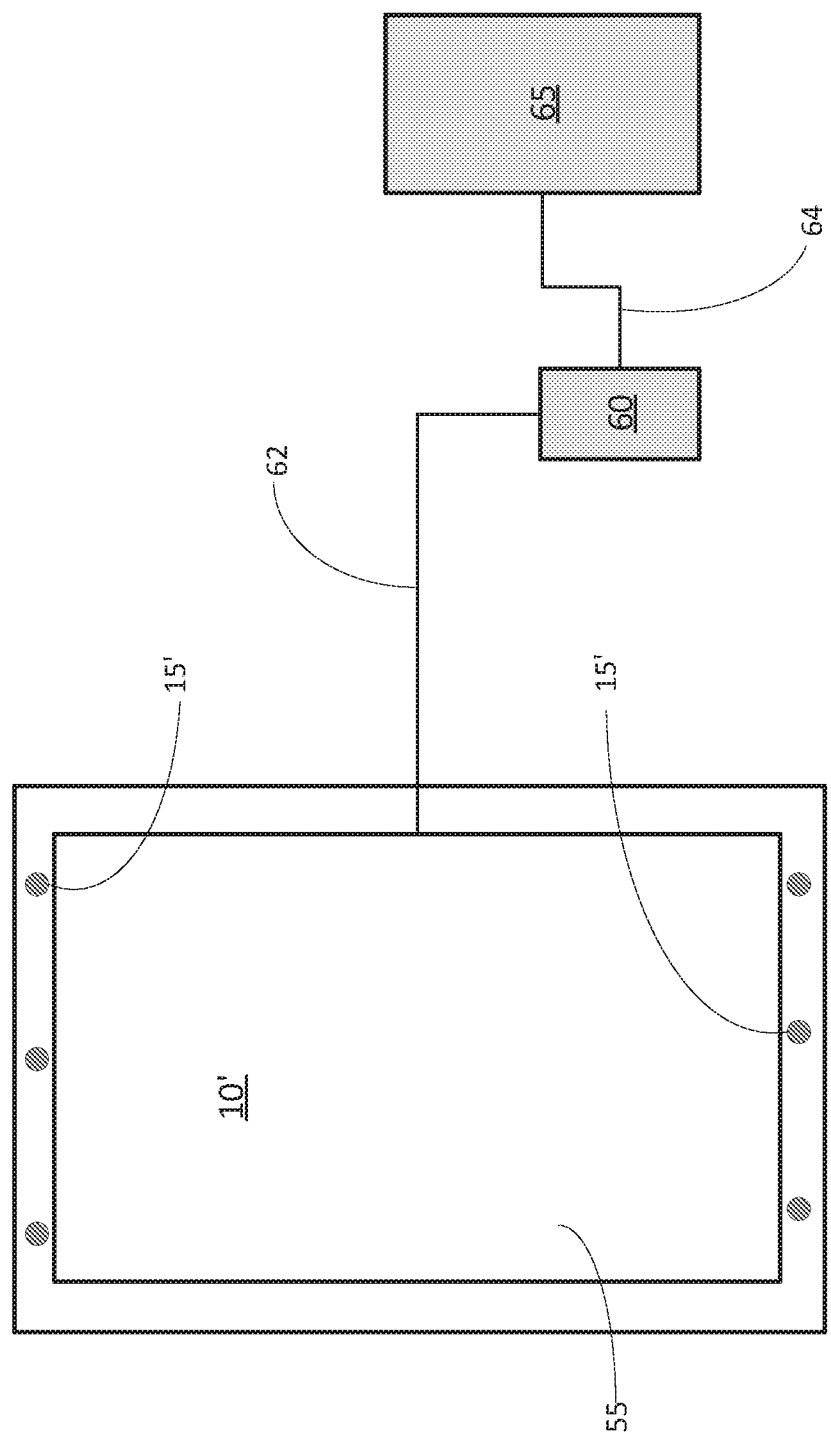
FIG. 4 is a schematic drawing of an example control system for controlling a tinting function of a window that has been adapted as provided hereon.

FIG. 4 shows a window that has been retrofitted to include tinting capabilities where the retrofitted window 10' is filled with an anti-ballistic material 55 that has tinting capabilities by providing a voltage from a voltage driving device 60 via electrical connection 62 in electrical communication with the material 55. The voltage driving device 60 may be controlled by a room or building control system 65 via a communication bus 64, for example. In this way, the window 10' can be provided with both anti-ballistic properties and tinting properties by using a retrofitting process to adapt existing windows to add these features without replacing the windows.

Finally, this process can be utilized to treat windows prior to their being installed in place rather than retrofitting them. For example, replacement thermal windows, which might typically contain a gas or vacuum between panes of glass, might instead be provided with the gaps being filled with ballistic resistant materials and/or tinting materials, as discussed herein, which can then be used to replace the panes of existing window structures while providing anti-ballistic protection.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A method of adapting an installed window already installed in a building to have anti-ballistic properties, comprising the steps of:
   drilling at least one hole in the installed window or a frame of the installed window without removing said installed window; and
   pumping a liquid fluid to add anti-ballistic properties to the installed window through the at least one hole into a gap between panes of transparent material in the installed window; and
   vibrating the installed window to enhance settling of the fluid into the gap between panes of transparent material in the installed window, wherein
   subsequent to said pumping step, the installed window exhibits improved anti-ballistic properties.

2. The method of claim 1, further comprising the step of curing the fluid that was pumped into the gap that was between panes of transparent material in the installed window.

3. The method of claim 1, further comprising the step of vibrating the installed window to enhance settling of the fluid into the gap between panes of transparent material in the installed window.

4. The method of claim 1, further comprising the step of drilling at least one gas escape hole in the installed window or a frame of the installed window to allow gas to escape from the gap between panes of transparent material in the installed window during the pumping step.

5. The method of claim 1, wherein said fluid permanently remains a fluid or gel while providing the improved anti-ballistic properties.

6. The method of claim 1, wherein said pumping step utilizes a portable pumping system that is transported to a building having he installed window.

7. The method of claim 1, wherein said fluid is comprised of one or more of a resin, liquified plexiglass, magnesium aluminate, PERLUCOR, a polycarbonate, an epoxy, and/or a fluid that thickens under shear force.

8. The method of claim 1, wherein said fluid includes a substance that provides controllable tinting capability for the installed window.

9. The method of claim 1, further comprising the step of sealing the at least one hole subsequent to the step of pumping the fluid.

10. A method of adapting an installed window already installed in a building to have anti-ballistic properties, comprising the steps of:
   drilling at least one hole in the installed window or a frame of the installed window without removing said installed window;
   pumping, using a portable pumping system, a liquid fluid to add anti-ballistic properties to the installed window through the at least one hole into a gap between panes of transparent material in the installed window;
   vibrating the installed window to enhance settling of the fluid into the gap between panes of transparent material in the installed window; and
   sealing the at least one hole subsequent to the step of pumping the fluid, wherein
   subsequent to said pumping step, the installed window exhibits improved anti-ballistic properties.

11. The method of claim 10, further comprising the step of curing the fluid that was pumped into the gap that was between panes of transparent material in the installed window.

12. The method of claim 11, wherein the step of vibrating the installed window to enhance settling of the fluid into the gap between panes of transparent material in the installed window is done prior to the step of curing the fluid.

13. The method of claim 10, further comprising the step of drilling at least one hole in the installed window or a frame of the installed window to allow gas to escape from the gap between panes of transparent material in the installed window during the pumping step.

14. The method of claim 10, wherein said fluid permanently remains a fluid or gel while providing the improved anti-ballistic properties.

15. The method of claim 10, wherein said fluid is comprised of one or more of a resin, liquified plexiglass, magnesium aluminate, PERLUCOR®, a polycarbonate, an epoxy, and/or a fluid that thickens under shear force.

16. The method of claim 10, wherein said fluid is includes a substance that provides controllable tinting capability for the installed window.

17. A method of adapting an installed window already installed in a building to have anti-ballistic properties using a portable system comprising a pump and at least one tank of a liquid fluid, said method comprising the steps of:
   drilling at least one hole in the installed window or a frame of the installed window without removing said installed window; and
   pumping, using the portable system, the fluid to add anti-ballistic properties to the installed window through the at least one hole into a gap between panes of transparent material in the installed window;
   vibrating the installed window to enhance settling of the fluid into the gap between panes of transparent material in the installed window; and
   sealing the at least one hole subsequent to the step of pumping the fluid, wherein
   subsequent to said pumping step, the installed window exhibits improved anti-ballistic properties.

18. A portable system for retrofitting an installed window already installed in a building to have anti-ballistic properties, said system comprising:
   a drilling subsystem to drill at least one hole in the installed window or a frame of the installed window without removing said installed window;
   a tank for holding a fluid;
   a pump and distribution system for transporting the fluid from the tank into a gap between panes of the installed window through the drilled at least one hole; and
   a vibrating device configured to vibrate the installed window to enhance settling of the fluid into the gap between the panes of the window.

* * * * *